United States Patent
Cherek

(10) Patent No.: US 11,900,211 B2
(45) Date of Patent: Feb. 13, 2024

(54) QUANTUM-CIRCUIT PACKING

(71) Applicant: ColdQuanta, Inc., Boulder, CO (US)

(72) Inventor: Joshua Johnathon Cherek, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 702 days.

(21) Appl. No.: 17/070,046

(22) Filed: Oct. 14, 2020

(65) Prior Publication Data

US 2022/0012616 A1 Jan. 13, 2022

Related U.S. Application Data

(60) Provisional application No. 63/049,240, filed on Jul. 8, 2020.

(51) Int. Cl.
*G06N 10/00* (2022.01)
*G06N 10/20* (2022.01)

(52) U.S. Cl.
CPC .................. *G06N 10/00* (2019.01)

(58) Field of Classification Search
CPC ........... G06N 10/00; G06N 5/01; G06N 10/20
See application file for complete search history.

(56) References Cited

U.S. PATENT DOCUMENTS

2020/0401925 A1* 12/2020 Hertzberg ............... G06F 30/30
2021/0350265 A1* 11/2021 Jung ....................... G06N 10/00

OTHER PUBLICATIONS

Keckey et al., Compiler Management of Communication and Parallelism for Quantum Computation, ACM, Mar. 14-18, 2015, 12 pages. (Year: 2015).*

\* cited by examiner

*Primary Examiner* — Nghia M Doan
(74) *Attorney, Agent, or Firm* — Van Pelt, Yi & James LLP; Clifton Leon Anderson

(57) ABSTRACT

A quantum computer system packs quantum circuits into quantum memory so the circuits can be run concurrently. A quantum-circuit packer includes a resource mapper and a packing evaluator. The resource mapper characterizes the task of identifying candidate packings of pending quantum circuits as an integer linear problem (ILP), for which solutions are known. The packing evaluator applies an optimization criterion to select an optimum packing from the candidate packings. The optimum packing is run; the results are assigned to respective circuits that make up the packing.

26 Claims, 4 Drawing Sheets

Quantum Computer System 100

Qubit Register 102

Atoms 122

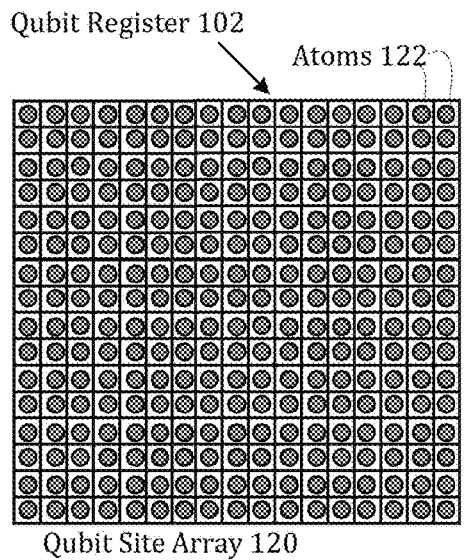

Qubit Site Array 120

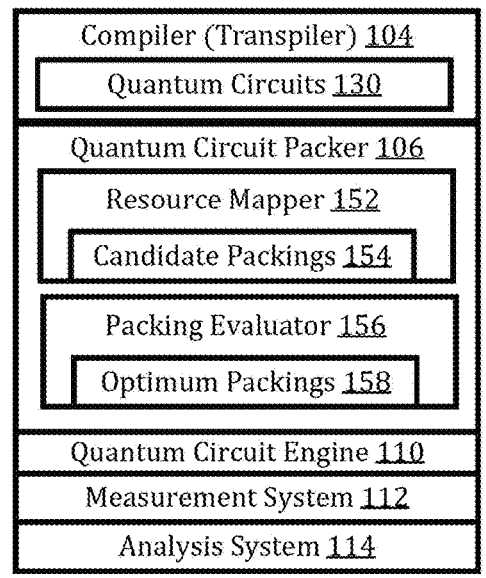

Compiler (Transpiler) 104

Quantum Circuits 130

Quantum Circuit Packer 106

Resource Mapper 152

Candidate Packings 154

Packing Evaluator 156

Optimum Packings 158

Quantum Circuit Engine 110

Measurement System 112

Analysis System 114

Pending Quantum Circuits 150

C0
C1
C2
C3
C4

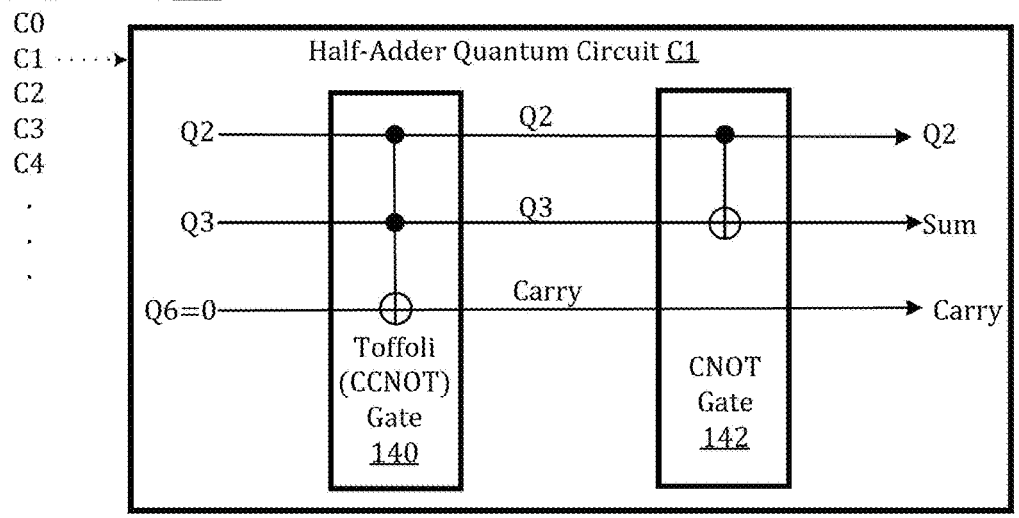

Half-Adder Quantum Circuit C1

Q2 — Q2 — Q2
Q3 — Q3 — Sum
Q6=0 — Carry — Carry

Toffoli (CCNOT) Gate 140

CNOT Gate 142

FIG. 1

QUANTUM-CIRCUIT PACKING

BACKGROUND

While classical digital computers manipulate bits of information, quantum computers manipulate qubits. Both classical bits and quantum qubits can be represented physically using two-state carriers. Examples of two-state quantum carriers Include an electron that can assume a spin up state and a spin down state, and an electron in an atom that can assume either of two excitation states. A classical two-state carrier assumes one or the other of the two states at any given time; a quantum two-state carrier can be in a coherent superposition of both states simultaneously. The phenomenon of quantum superposition is key to the ability of quantum computers to solve some problems much faster than they can be solved using classical computers.

Implementation of quantum computers depends on the underlying technology used to physically represent the qubits, e.g., superconductors, ions, or cold-neutral atoms. One of the advantages of using cold atoms or ions is that atoms of the same element and atomic weight are naturally identical so that manufacturing tolerances are not an issue (as they may be when the qubits are defined in superconductors). Another advantage of cold atoms is that they can be packed closely together without interacting, in contrast to, for example, ions. On the other hand, nearby cold atoms can be made to interact by causing them to enter Rydberg (very high excitation) states so that they become entangled. Thus, cold atoms readily provide for relatively large qubit-count quantum memories, e.g., with hundreds and thousands of qubits.

BRIEF DESCRIPTION OF THE DRAWINGS

FIG. 1 is a schematic diagram of a quantum-computer system.

DETAILED DESCRIPTION

Figures 2A, 2B:
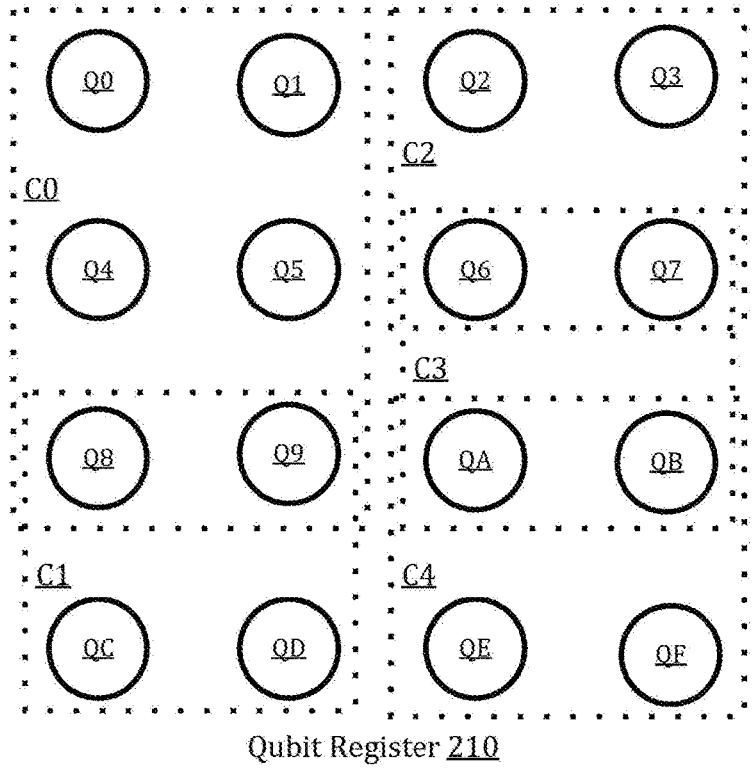
FIG. 2A is a graphic resource map of quantum circuits to a portion of a quantum register of FIG. 1.
FIG. 2B is a resource map in tabular form equivalent to the graphic resource map of FIG. 2A.

The present invention provides for increasing the efficiency with which qubit memories, e.g., a quantum register, can be used to implement quantum circuits by optimizing the packing of quantum circuits into the qubit memory. The qubit memory can be defined as a set of resources including qubits. Each of a set of circuits to be implemented can be characterized by those resources it requires. An optimization routine can then be applied to optimize mapping of required resources to available resources according to a selected optimization criterion, e.g., maximizing the number of circuits run concurrently.

Optimally packing a qubit memory increases utilization and throughput. Also, it allows an automated calibration system to perform measurement and calibration of qubits while simultaneously running customer circuits. Since multiple circuits can be run in a single shot, processing throughput can be increased. In the context of a use-based business model, tiered pricing can be offered based on the number of qubits used. For example, the price to run (e.g., educational or marketing) circuits with fewer qubits can be reduced.

As shown in FIG. 1, a quantum computer system 100 includes a qubit register 102, a compiler 104, a quantum-circuit packer 106, a quantum circuit engine 110, a measurement system 112, and an analysis system 114. In an alternative embodiment, a quantum memory can include more than one register. Qubit register 102 includes a qubit site array 120, e.g., defined by an optical array trap, populated by quantum-state carriers 122, e.g., rubidium 87 atoms. Other embodiments can employ different types of quantum-state carriers, e.g., other charged or neutral atoms or molecules, superconductor elements, photons, electrons, etc. Compiler 104 converts programs to machine-specific quantum circuits; if the conversion to the machine-specific quantum circuits is from a machine-independent quantum circuits, e.g., in a Quantum Assembly Language (QASM), the compiler can be referred to as a "transpiler".

In a quantum-circuit model for quantum computation, qubit values are manipulated using a series of quantum logic gates. Quantum logic gates are required to be "reversible" in that the inputs to quantum logic gates must be determinable from its outputs. Many logic gates that are familiar in the context of classical computing, e.g., AND, NAND, OR, NOR, XOR, XNOR, are not reversible. Hence, quantum circuits are built using other gates that are reversible such as the control-not (CNOT) gate, the CZ gate, the Hadamard gate, the swap gate, phase shift gates, and the Toffoli (CCNOT) gate.

A quantum circuit includes an arrangement of (one or more) quantum gates. For example, a half-adder quantum circuit C1 includes a Toffoli gate 140 and a controlled-not (CNOT) gate 142. The Toffoli gate, also known as a controlled-controlled-NOT (CCNOT) gate, inverts the 0 input qubit if and only if (iff) the top two bits are both 1. In the illustrated case, 0 input becomes a 1 iff X1=X2=1 and remains at 0 otherwise. In other words, Toffoli gate 140 outputs the carry bit. CNOT gate 142 inverts the X2 value iff X1=1 and leaves X2 unchanged otherwise; in other words, CNOT gate 142 converts the X2 input to the modulo 2 sum X1+X2. CNOT gate 142 leaves X1 (and the carry value) unchanged.

At any given time, there may be a number of circuits pending, that is, in a queue waiting to be run. For example, as shown in FIG. 1, circuit C1 is one of plural pending circuits 150 that also include circuits C0, C2, C3, C4 and so on. A performance advantage may accrue when plural circuits are packed together in a qubit register so that they can be run in parallel instead of serially. A purpose of the quantum circuit packer 106 is to optimize the packing of circuits in a qubit register or other memory so as to maximize this performance advantage. To this end, quantum circuit packer 106 includes: 1) a resource mapper 152 that identifies candidate packings 154; and 2) a packing evaluator 156 that selects optimum packings 158, e.g., one packing of quantum circuits from a set of pending circuits to be run in parallel.

Quantum-circuit engine 110 runs each optimum packing 158 using the underlying qubit technology, e.g., cold atoms, ions, superconductors. In illustrated case involving cold neutral atoms, the engine includes lasers and laser control circuitry. In this example, the instructions can cause a laser pulse to be directed to a specific qubit, e.g., to cause it to transition between excitation states. The results of a run of a circuit packing are read out by measurement system 112. The read out is analyzed by analysis system 114, which uses information about the packing to assign results to their respective circuits in the packing.

As mentioned above, a purpose of the quantum circuit packer 106 is to optimize the packing of circuits in a qubit register or other memory. The operation of quantum-circuit packer 106 can be visualized with reference to a graphic resource map 201 of FIG. 2A. Map 201 shows quantum circuits C0-C4 in relation to a qubit register 210, which, for expository purposes, is a 4×4 array of qubits Q0-QF; in practice, a much larger register, e.g., the size of qubit register 102 (FIG. 1) or larger, would be used. The positions at which quantum circuits C0-C4 are shown in FIG. 2A are specified by the quantum-circuits themselves. For example, a quantum circuit may specify a memory or register location because of its superior reliability or because it is a target of a diagnostic activity or a maintenance cycle.

Inspection of graphic resource map 201 shows that circuits C0 and C1 overlap; in other words, they require some of the same qubits, in this case qubits Q8 and Q9. Since they require some of the same qubits, it cannot be assumed that circuits C0 and C1 can be run concurrently in the same register. Therefore, resource mapper 152 of quantum-circuit packer 106 (FIG. 1) does not include any candidate packings that include both circuits C0 and C1. Likewise, graphic resource map 201 shows circuit C3 overlapping circuit C2 and circuit C4. Accordingly, resource mapper 106 does not include any candidate packings that include circuit C3 and either C2 or C4 or both. To exclude conflicts over available resources, resource mapper 152 includes only sets of disjoint (and, thus, non-overlapping) pending circuits in each candidate packing.

The procedure described above with reference to graphic resource map 201 can be generalized as explained below with reference to tabular resource map 202 of FIG. 2B, which re-presents the same information as map 201. Tabular resource map 202 includes rows corresponding to pending quantum circuits, in this case, C0-C4, and columns corresponding to qubits, in this case, qubits Q0-QAF. Cells at the intersection of a circuit row and a qubit column show a "1" is the respective circuit requires the respective qubit and is left empty if the respective circuit does not require the respective qubit. An additional "pending demand" row 204 sums the is in the circuit rows to determine the number of circuits requiring the respective circuit. As shown in FIG. 2B, pending demand row 204 is filled with 1s and 2s; more generally, a pending demand row would be filled with whole numbers, i.e., non-negative integers.

Resource mapper 152 identifies candidate packings in the form of sets of pending circuits that would result in only 0s and 1s in the pending demand row. For example, no qubit column in map 202 includes is for both circuit C0 and circuit C4. Accordingly, the column sums for a C0+C4 packing would contain only 0s and 1s. Therefore, circuits C0 and C4 can be packed together in a candidate packing. On the other hand, circuits C0 and C1 both includes 1s in the qubit Q8 and qubit Q9 column, so the column sums for a packing of C0 and C1 would include some sums greater than one. Therefore, circuits C0 and C1 cannot be packed together.

The task of identifying packable subsets of pending quantum circuits can be expressed as an integer linear problem (ILP), solutions for which are known. While exact solutions for scenarios with large quantum registers and large numbers of pending quantum circuits may be infeasibly resource intensive, resource mapper 150 can apply available heuristic solutions that provide "good-enough" solutions in more practical time spans. In alternative embodiments, other procedures can be used to identify candidate packings as subsets of non-overlapping pending circuits. The permitted candidate packings for circuits C0-C4 are: C0, C1, C2, C3, C4, C0+C2, C0+C3, C0+C4, C1+C2, C1+C3, C1+C4, C0+C2+C4, and C1+C2+C4. Thus, in the illustrated case, there are thirteen candidate packings 154: five single-circuit packings, six two-circuit packings, and two 3-circuit packings.

Packing evaluator 156 (FIG. 1) applies an optimization criterion to select an optimum packing 158 from the candidate packings identified by resource mapper 152. Depending on the embodiment, the optimization criterion can take various factors into account, e.g., the number of circuits in the packing, and/or the number of qubits utilized by the packing. For example, if the number of circuits is the primary factor for the optimization criterion, then, in the above example, there would be a choice of 3-circuit packings: C0+C2+C4 or C1+C2+C4. If, in this example, qubit utilization is a secondary factor for the optimization criterion, C0+C2+C4, which uses fourteen qubits would be selected over C1+C2=C4, which uses twelve qubits.

Optimization criteria can take into account weightings assigned to quantum circuits to reflect relative priorities. For example, circuits submitted by high priority accounts can be weighted more than circuits from regular accounts. Also, the weighting applied to a circuit can be increased each time it is passed over by a packing process to ensure it can eventually be run. In an embodiment, pending demand for qubits is tracked, and circuits requiring qubits in highest demand from pending quantum circuits are assigned a lower priority than those that require only qubits with relatively low demand. Those skilled in the art are able to consider a wide variety of other factors and optimization criteria.

Figure 3:
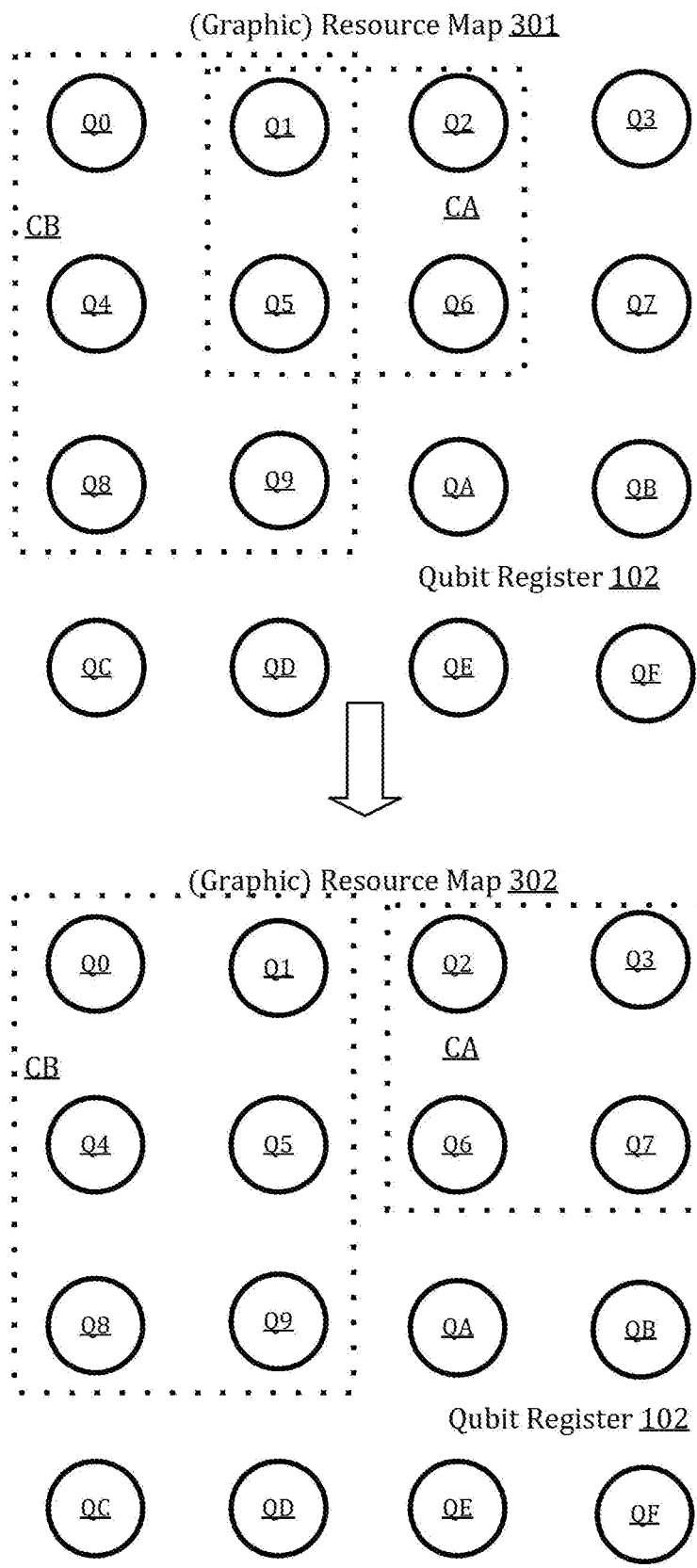
FIG. 3 shows a remapping of a quantum circuit from one position to another of a quantum register shown in FIG. 2A.

The degree to which a set of pending quantum circuits can be packed is affected by the memory locations of the qubits required by the quantum circuits, as indicated by a comparison of the graphic resource maps 301 and 302 of FIG. 3. In map 301, quantum circuit CA requires qubits Q1, Q2, Q5, and Q6; quantum circuit CB requires qubits Q0, Q1, Q4, Q5, Q8, and Q9. Quantum circuits CA and CB overlap in that they both require qubits Q1 and Q5. Therefore, quantum circuits CA and CB cannot be packed together. If they are the only two pending circuits, each would be in a respective 1-circuit packing and would be run serially. However, if quantum circuit CA is moved one qubit to the right to require qubits Q2, Q3, Q6 and Q7, and not require qubits Q1 and Q5, then there is no overlap and they can be packed together as indicated by map 302.

As FIG. 3 illustrates, there can be a packing and performance advantage to providing for flexibility in positioning of a quantum circuit. Some embodiments permit the quantum-circuit packer to remap a quantum circuit so that it requires a set of qubits that differs from the set originally specified. Thus, in FIG. 3, qubit QA would original specify qubits Q1, Q2, Q5, and Q6, but the resource mapper would remap to Q2, Q3, Q6, and Q7. The original circuits could include a flag that indicates whether or not remapping is permitted, as remapping would defeat the purpose of some quantum circuits, e.g., those used for trouble-shooting or maintenance.

Some embodiments use a compiler that can generate a group of alternative quantum circuits (if the input program enables this flexibility). Each circuit of the group can identify itself to the resource mapper so that it knows that at most one of the group can be included in any given candidate packing. Alternatively, a compiler can keep track of pending circuit demand 204 (FIG. 2B), and output a circuit that avoids use of the most in-demand qubits.

Some embodiments provide flexibility by allowing quantum circuits to specify requirements abstractly so that they can be satisfied by alternative sets of qubits. In other words, the quantum circuits are templates that do not specify specific qubits. For example, quantum circuit CA in FIG. 3 could specify a square arrangement of four qubits, without specifying which four qubits are to be used. In that case, the resource mapper can select the specific position that provides for the best packability. For example, the resource mapper can consider all possible compatible positions for a circuit can be considered in identifying candidate packings with a constraint that at most one of those positions would be included in any given candidate packing. The variations permitted by a template or a set of related templates can include quantum circuits of different shapes, e.g., square, rectangular, L-shaped, etc.

Figure 4:
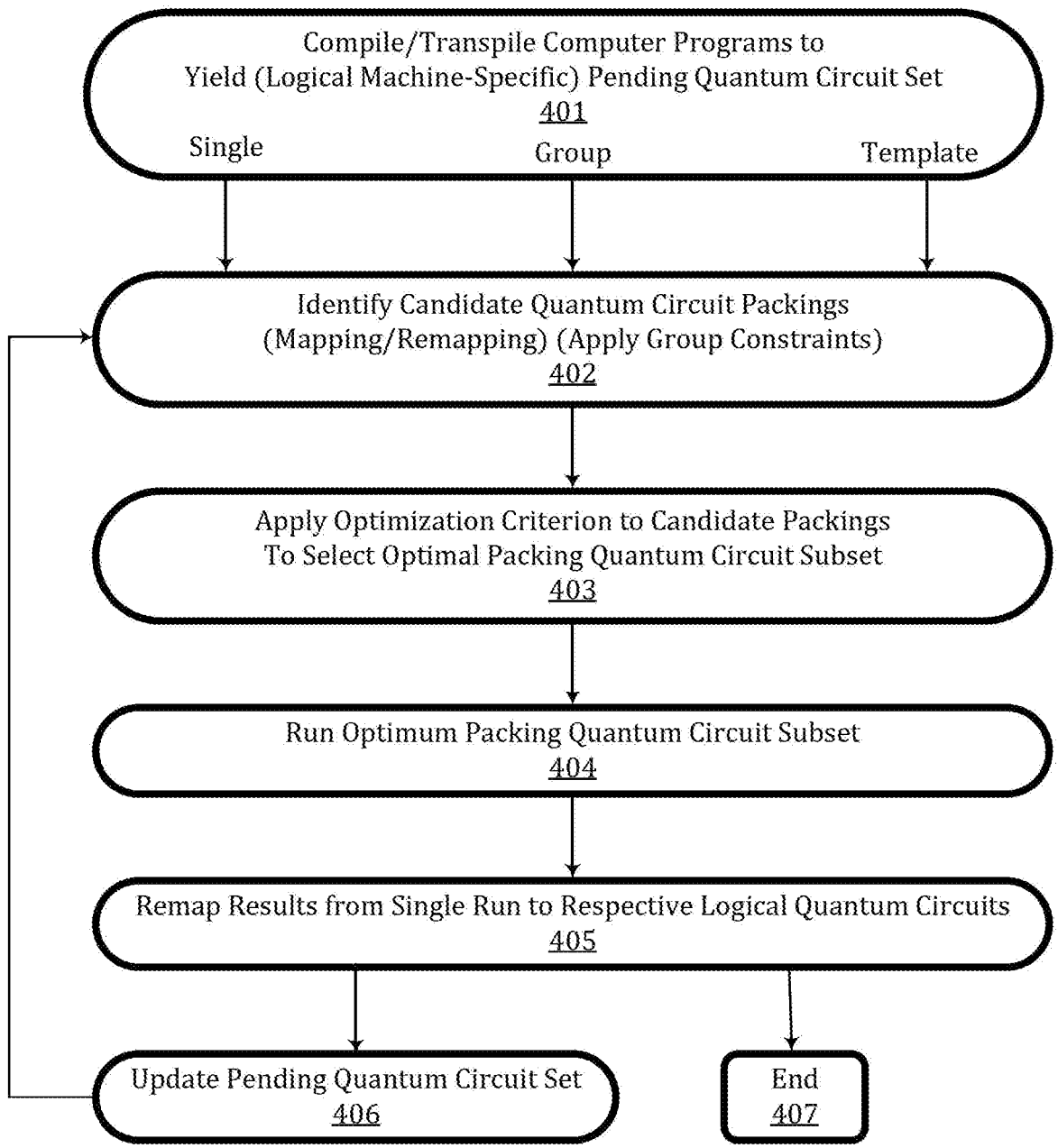
FIG. 4 is a flow chart of a quantum-circuit packing process.

A quantum-circuit packing process 400 is flow-charted in FIG. 4. At 401, computer programs are compiled to yield a pending quantum circuit set. At 402, candidate quantum-circuit packings for the pending quantum circuits are identified. In the event that groups of alternative quantum circuits or circuit templates or remapping are involved, a group constraint can be applied so that at most one quantum circuit of a group is included in a candidate packing. In the event that a quantum-circuit template is involved or remapping of quantum-circuits is involved, the resource mapper can generate quantum circuit groups and apply group constraints in identifying quantum-circuit packings. At 403, an optimization criterion is applied to the candidate packings to select an optimum packing. At 404, the selected quantum-circuit packing is run. At 405, the results of the run are mapped to respective quantum circuits of the packing that was run.

At 406, the quantum-circuit set is updated, e.g., by the quantum-circuit packer. The circuits of the packing just run may no longer be pending. Also, in the interim, new circuits can have joined the set of pending quantum circuits. Process 400 can then return to 402 to identify candidate packings based on the updated pending quantum circuit set. Once there are no more pending quantum circuits, process 400 can end at 407.

Herein, a "quantum circuit" is a software object that can be implemented using a quantum-circuit engine of a quantum computer. Herein, a "packing" is a quantum circuit set including one or more disjoint quantum circuits to be executed concurrently. Herein, "optimal" characterizes a packing resulting from exercise of an optimization criterion. Herein, the memory or register resources required by a circuit can be specified by identifying memory or register locations of those resources. Herein, A is "based on" B means B is at least partially determined by A. Herein, "compiler", "transpiler", "quantum-circuit packer", "resource mapper", "packing evaluator", and "analysis system" encompass computer hardware, software, and combinations of hardware and software configured to perform the functions described herein for the respective components. Herein, "quantum-circuit engine" and "measurement system" include non-computer hardware, e.g., lasers and other optical components, magnets, and may also include software, computer hardware, and combinations of software and computer hardware.

Herein, art labeled "prior art", if any, is admitted prior art; art not labelled "prior art" is not admitted prior art. The illustrated and described embodiments, variations thereupon and modifications thereto are provided for by the present invention, the scope of which is defined by the following claims.

What is claimed is:

1. A quantum-circuit-packing process comprising:
   identifying candidate packings, each candidate packing including one or more quantum circuits required resources of which constitute respective disjoint subsets of resources of a quantum memory;
   selecting an optimal packing from the candidate packings based on an optimization criterion; and
   running the optimal packing on hardware including the quantum memory,
   wherein the identifying includes: characterizing the identifying as an integer linear problem (ILP) regarding mappings of register resources required by the quantum circuits to available register resources; and solving the ILP to yield the candidate packings.

2. The quantum-circuit-packing process of claim 1 further comprising:
   after the running, measuring qubits to obtain qubit measurements; and
   mapping the qubit measurements from a single run on the quantum memory to respective quantum circuits of the optimal packing.

3. The quantum-circuit-packing process of claim 1 wherein the ILP is solved exactly.

4. The quantum-circuit-packing process of claim 1 wherein the ILP is solved heuristically.

5. The quantum-circuit-packing process of claim 1 wherein the quantum memory includes a qubit-site register populated by atoms.

6. The quantum-circuit-packing process of claim 5 wherein the atoms are of alkali or alkaline-earth elements.

7. The quantum-circuit-packing process of claim 1 further comprising, prior to the identifying, compiling a program to yield at least a first quantum circuit.

8. The quantum-circuit-packing process of claim 7 wherein the first quantum circuit specifies memory locations of qubits required by the first quantum circuit.

9. The quantum-circuit-packing process of claim 8 further characterized in that the selecting includes tracking pending demand for memory resources, wherein the selecting is based on the tracked pending demand.

10. The quantum-circuit-packing process of claim 7 wherein the first quantum circuit characterizes the resources of the quantum memory it requires such that its requirements can be met in alternative ways by respectively different sets of physical resources of the quantum memory.

11. The quantum-circuit-packing process of claim 1 further comprising, prior to the identifying, converting a program to a group of plural quantum circuits that specify respectively different sets of physical resources of the quantum memory to meet their respective requirements.

12. The quantum-circuit-packing process of claim 11 wherein the plural quantum circuits include quantum circuits of different shapes.

13. The quantum-circuit-packing process of claim 11 wherein the identifying includes applying a group constraint so that no candidate packing includes more than one quantum circuit of the group of plural quantum circuits resulting from transpiling of a single program.

14. A quantum computer system comprising:
   a quantum-circuit packer that
      identifies candidate packings, each candidate packing including one or more circuits required resources of which constitute disjoint subsets of resources of a quantum memory, and
      selects an optimal packing from the candidate packings based on an optimization criterion; and a quantum-circuit engine that runs the optimal packing on hardware including the quantum memory wherein the quantum-circuit packer includes a resource mapper for mapping resource requirements of quantum circuits to available quantum-memory resources, the quantum-circuit packer expressing the identifying of candidate packings as an integer linear problem (ILP) based on the mapping, and solving the ILP to yield the candidate packings.

15. The quantum computer system of claim 14 further comprising:

a measurement system for evaluating qubits to yield qubit measurements; and an analysis system that maps the qubit measurements from a single run on the hardware to respective quantum circuits of the optimal packing.

16. The quantum computer system of claim 14 wherein the quantum-circuit packer solves the ILP exactly.

17. The quantum computer system of claim 14 wherein the quantum-circuit packer solves the ILP heuristically.

18. The quantum computer system of claim 16 wherein the quantum memory includes a qubit-site array populated by atoms.

19. The quantum computer system of claim 18 wherein the atoms are of alkali or alkaline-earth elements.

20. The quantum computer system of claim 14 further comprising a compiler that converts a program to at least a first quantum circuit.

21. The quantum computer system of claim 20 wherein the first quantum circuit specifies memory locations of qubits that the first quantum circuit requires.

22. The quantum computer system of claim 21 wherein the quantum-circuit packer includes the resource mapper that tracks pending demand for memory resources, wherein the selecting is based on the tracked pending demand.

23. The quantum computer system of claim 20 wherein the first quantum circuit characterizes the resources of the quantum memory it requires so that its requirements can be met by different sets of physical resources of the quantum memory.

24. The quantum computer system of claim 14 further comprising a compiler that converts a program to a group of plural quantum circuits that specify respectively different sets of physical resources of the quantum memory to meet their respective requirements.

25. The quantum computer system of claim 24 wherein the group of plural quantum circuits includes circuits of different shapes.

26. The quantum computer system of claim 24 wherein the identifying includes applying a group constraint so that no candidate packing includes more than one circuit of the group of plural quantum circuits resulting from conversion of a single program.

* * * * *